United States Patent Office 2,982,618
Patented May 2, 1961

2,982,618
PROCESS FOR THE CATALYTIC PRODUCTION OF PERCHLORYL FLUORIDE

Howard M. Dess, Niagara Falls, N.Y., assignor to Pennsalt Chemicals Corporation, Philadelphia, Pa., a corporation of Pennsylvania No Drawing. Filed May 24, 1960, Ser. No. 31,262

16 Claims. (Cl. 23—203)

This invention relates to perchloryl fluoride, $ClO_3F$. Particularly it pertains to improvements in the method for the preparation of $ClO_3F$ which comprises reacting an inorganic perchlorate with fluosulfonic acid. More particularly it relates to use of specific fluoride additives in a reaction mass comprising perchlorate and fluosulfonic acid whereby significant increases in the yield of $ClO_3F$ are obtained.

Perchloryl fluoride can be prepared by reacting an inorganic perchlorate with fluosulfonic acid as disclosed and claimed in copending application Serial No. 19,145 filed April 1, 1960, by William A. LaLande, Jr.

Perchloryl fluoride can also be prepared by reacting an inorganic perchlorate with antimony pentafluoride as disclosed and claimed in copending application Serial No. 626,319, filed December 5, 1956, by Alfred F. Engelbrecht, now U.S. Patent 2,942,947, issued June 28, 1960.

Perchloryl fluoride can be prepared too by reacting an inorganic perchlorate with a mixture of fluosulfonic acid and antimony pentafluoride which is synergistic in effect as disclosed and claimed in copending application Serial No. 695,034, filed November 7, 1957, by Gerhard Barth-Wehrenalp and Harry C. Mandell, Jr., now U.S. Patent 2,942,949, issued June 28, 1960.

The present invention is directed to improvements which are particularly effective when used in combination with the method of LaLande, above. Fluosulfonic acid is disclosed by LaLande to be not only one of the few operable fluorinating agents usable alone for the preparation of $ClO_3F$, but also the most efficient and economical. In the LaLande method, yields of $ClO_3F$ of 73% and higher, based on potassium perchlorate charged, are disclosed. In practicing the method according to the LaLande invention, I have now found means whereby the yield of $ClO_3F$ can be kept consistently above 73% and can be raised to about 85% and above by the addition of specific inorganic fluoride materials which, when heated with a perchlorate in the absence of fluosulfonic acid, do not react with the perchlorate even at high temperature to form $ClO_3F$. In the latter respect, the inorganic fluoride materials used in practicing my invention are readily distinguishable from antimony pentafluoride, which Engelbrecht, above, has shown gives a practical yield of about 53% of $ClO_3F$ when reacted with an inorganic perchlorate used in the practice of this invention.

According to the method of my invention, perchloryl fluoride is prepared by reacting an inorganic perchlorate with an amount of fluosulfonic acid sufficient to form perchloryl fluoride in the presence of at least a catalytic amount of boron trifluoride, antimony trifluoride, or hydrogen fluoride. Through use of one or more of these fluorides, yields of $ClO_3F$ in the range above 73% are readily obtained. Antimony trifluoride is particularly effective and is preferred as the additive when highest yield is the prime consideration. However, from the standpoint of ease of recovery of the spent fluosulfonic acid, boron trifluoride is the preferred additive.

None of the above fluoride materials produces $ClO_3F$ when reacted alone with an inorganic perchlorate in the absence of fluosulfonic acid. For example, A. Engelbrecht and H. Atzwanger, Mh. Chem. 83, 1087 (1952), show that electrolysis must be used to obtain even a small yield of $ClO_3F$ on reacting sodium perchlorate with anhydrous hydrofluoric acid. Furthermore, I have found that, whereas the above-named fluoride materials are advantageous for the practice of my invention, other fluoride materials are actually detrimental. For example, when zinc fluoride, aluminum fluoride, lead fluoride, silver fluoride, or uranium tetrafluoride are present in the reaction mass with the inorganic perchlorate and fluosulfonic acid, the yields of $ClO_3F$ obtained are in the range from about 10% to 50%.

The catalytic fluorides which I have found advantageous for use in this invention are all fluorides which are stable toward oxidation by the inorganic perchlorate and $ClO_3F$ under the conditions of the $ClO_3F$ formation reaction. Furthermore, they do not react to any significant extent with fluosulfonic acid, e.g. to form fluosulfonates. They also are each readily separated from the $ClO_3F$ produced. In the case of boron trifluoride, an added advantage exists in that, because of its gaseous form at ordinary temperatures, it is readily separated from the reaction mass, leaving no residual additive material in the spent acid in the reactor.

My catalytic fluorides are readily available, well-known materials. They can be of technical grade quality. Preferably, they should be in anhydrous form, in order not to dilute the fluosulfonic acid by addition of water or induce corrosive conditions.

The quantity of catalytic fluoride used should be an amount at least sufficient to maintain the yield of $ClO_3F$ above about 73% and preferably should be in an amount sufficient to increase the yield to the range 75–97%. I have found that the quantity of fluoride used thus can range from slightly over 1 part to as much as 100 parts of fluoride per 100 parts by weight of fluosulfonic acid. Preferably from 2 to 25 parts of the fluoride per 100 parts by weight of fluosulfonic acid are used. My catalytic fluorinating agent mixture thus consists of my catalytic fluoride and fluosulfonic acid in the ratio of about 1:1 to about 1:100 parts by weight. A ratio in the range of 1:4 to 1:50 parts by weight of fluoride to fluosulfonic acid is especially preferred.

The quantity of catalytic fluoride which it is desirable to use to obtain maximum yield improvement depends on the particular fluoride. In the case of antimony trifluoride, optimum yields of $ClO_3F$, e.g., about 90% or more, based on weight of perchlorate charged, are obtained when about 5 to 25 parts by weight are used to 100 parts of fluosulfonic acid. In the cases of boron trifluoride and hydrogen fluoride in a continuous process, since each is a gas at usual reaction temperatures, the amount of each that is used is dependent on the solubility of the gas in the reaction mass at the temperature of operation and on the rate at which the gas then is passed into the reactor vessel over the period of time used in carrying out the reaction. In a pressurized reactor system from about 10 to about 20 parts of boron trifluoride or hydrogen fluoride are used to 100 parts by weight of fluosulfonic acid. A $ClO_3F$ yield of above 85% is obtained in either case.

Unlike the synergistic effect which results when antimony pentafluoride is used in the presence of fluosulfonic acid according to the method of Barth-Wehrenalp et al., above, the fluorides of this invention have an effect which appears to be principally of a catalytic nature on the fluorinating activity of the fluosulfonic acid. Thus, when boron trifluoride, for example, is used as the additive, it passes through the reactor mass and is trapped in the caustic scrubbers of the ClO₃F recovery system in substantially the same quantity as was added to the reactor vessel. Whereas little or none of the fluoride then is found to have been consumed, the yield of ClO₃F is significantly increased by 2 to 15% or more.

In a preferred embodiment of my invention 10 parts by weight of potassium perchlorate are dissolved in about 100 parts of fluosulfonic acid and the solution is fed continuously into the upper end of a vertical, packed tower type reactor where the solution is reacted at a temperature of from about 100° C. to 135° C. for from 1 to about 10 minutes, depending on the temperature used (i.e., the longer time being used at the lower temperature). A stream of boron trifluoride is simultaneously introduced about midway up the tower at a rate of from about 1 to 10 parts per 100 parts by weight of fluosulfonic acid entering the tower per minute. The ratio of parts of boron trifluoride to parts of fluosulfonic acid present in the reaction mass thus is maintained at about 1:10 in the upper half of the tower. Preferred reaction conditions are a temperature of about 105° C. to 110° C. and a reaction time of about 5 minutes. The ClO₃F formation reaction occurs rapidly and, as evidenced by evolution of only traces of ClO₃F from samples of the residual mass taken at the lower end of the reactor, is substantially completed during passage of the reaction mass through the tower. The residual reaction mass is continuously withdrawn from the reactor system.

In the practice of this embodiment, the reaction is carried out in a reaction vessel into which the reactants flow continuously, and the ClO₃F leaves as a gaseous overhead product mixed with the boron trifluoride, while the liquid residual reaction mass, containing the spent fluosulfonic acid and by-product compounds, discharges at the bottom of the vessel at the end of the prescribed retention period.

The boron trifluoride in the effluent gases can be separated from the ClO₃F in a number of ways. Preferably the ClO₃F is liquefied by cooling or compression, or a combination of the two methods, and the boron trifluoride then is removed as a gas which can be recycled to the reactor. The boron trifluoride also can be absorbed by passing the ClO₃F product stream through sulfuric acid, or into a caustic solution, in the latter case forming a fluoborate. The ClO₃F can be purified further for storage and use by gas-washing methods described in the prior art. See, for example, the copending applications cited above.

Antimony trifluoride is used in the practice of a similar embodiment as above, except that as the antimony trifluoride is a solid, it is preferably introduced into the reactor in finely-divided form in the fluosulfonic acid-perchlorate liquid. The spent fluosulfonic acid carries the antimony trifluoride along with it out of the reactor system.

Hydrogen fluoride is introduced into the reactor in a similar embodiment as a liquid or gas and is substantially removed from the ClO₃F in the effluent gas stream by scrubbing the stream with caustic solution.

The fluosulfonic acid used in the practice of the invention is commercially available. The technical grade of fluosulfonic acid containing about 98% HSO₃F has been found satisfactory for use.

The perchlorates used in carrying out the present process are those inorganic perchlorates disclosed by LaLande, above, to be useful for the preparation of ClO₃F in the presence of fluosulfonic acid. Potassium perchlorate is preferred. Sodium, ammonium and magnesium perchlorates and perchloric acid can also be used with good results. Other perchlorates also can be used to carry out the invention. These include the perchlorates of barium, calcium, lithium, and silver and nitrosyl perchlorate. The term "inorganic perchlorate" used in certain of the claims is intended to include perchloric acid as well as its salts. The term alkali perchlorate is intended to include the ammonium and alkali and alkaline earth metal perchlorates. Relative costs and availabilities favor the use of the potassium and sodium salts. Technical grade perchlorate has been found to work as well as material of higher purity. A low chlorate content is desirable in the perchlorate in order to minimize formation of undesirable by-products.

Perchlorates and my novel catalyzed fluosulfonic acid fluorinating agent mixture can be reacted in most proportions to form some perchloryl fluoride. However, from the standpoint of optimum safety as well as of optimum yield, it is preferred to use sufficient excess catalyzed fluorinating agent mixture to dissolve the perchlorate. For potassium perchlorate this condition exists when the fluosulfonic acid is present in the reaction mass in the ratio of about 6 parts to 1 part by weight of potassium perchlorate. When more perchlorate is used than can be dissolved in the mixture, dormant masses of solid perchlorate could accumulate which might react explosively with by-products formed during the reaction. In an advantageous procedure for practising my invention, fluosulfonic acid is mixed first with the inorganic perchlorate in the ratio of at least six moles, and preferably about 12 moles, of fluosulfonic acid to one mole of the perchlorate, and the catalytic fluoride is then added in the reactor system. A preferred proportion of reactants in the reaction mass is 10 parts by weight of the catalyzed fluorinating agent mixture, of which at least 6 parts are fluosulfonic acid, to 1 part of inorganic perchlorate.

When a solid perchlorate is used, it is preferably used in the form of small-sized particles which will readily go into solution in the fluorinating agent mixture. Complete solution of the perchlorate is desirable. When more than about 1 part by weight of a solid form of perchlorate is used per about 5 parts of fluorinating agent mixture, the solubility limit is exceeded and a suspension of perchlorate crystals in the acid results. Addition of more acid and agitation are then necessary to aid solution and to avoid accumulation of large settled masses of perchlorate in the reactor. Mixing is preferably done at room temperatures to carry out the solution step.

In carrying out the reaction of this invention the preferred temperature is 40° to 90° C. The temperature may be raised to the boiling point of the fluosulfonic acid, which at atmospheric pressure is about 163° C.; however, when gaseous boron trifluoride or hydrogen fluoride is used as a catalyst in a non-pressurized reactor system a lower temperature, around 90° C., is preferred, in order to keep the catalyst content of the reaction mass at an optimum level. Addition of heat is desirable to maintain a high rate of reaction to form ClO₃F. Temperatures above 40° C. are preferred for this purpose. Below 40° C., the reaction between the catalyzed fluosulfonic acid and the perchlorate proceeds at a relatively slow rate. Some reaction to form perchloryl fluoride occurs, however, even when the reactants are mixed together at a temperature as low as 0° C. This latter feature permits generation of perchloryl fluoride in readily controllable low volumes at temperatures in the range from about 0° C. to about 40° C. where the perchloryl fluoride is used directly from the generator, for example, as a fumigant or as a reactant in another chemical reaction.

The invention may be practiced as a batchwise or as a continuous operation. In batch type operations, after the perchlorate has been contacted with the catalyzed fluorinating agent mixture, heat is preferably applied gradually to maintain a readily controlled optimum reaction rate.

The time required to carry out the reaction between the perchlorate and the novel fluorinating agent mixture is dependent principally on the temperature at which the operation is carried out. In a conventional batch-type reactor the reaction can be completed within reaction periods ranging from about 2 to 8 hours. The practical rate in each case is influenced by the efficiency of the equipment used to remove and recover the evolved $ClO_3F$. A period of 4 hours is preferred for a batch-type reaction using a charge of 1 part by weight of perchlorate to about 10 parts of the catalyzed fluorinating agent mixture at about 75° C. When a continuous operation is carried out, higher temperatures are preferably used and the reaction takes place much more rapidly, as disclosed above.

The invention and its practice are further illustrated by the following examples, in which the parts are by weight unless otherwise stated. Potassium perchlorate is used in the examples as a representative inorganic perchlorate. It is to be understood that other inorganic perchlorates of the group described above may likewise be used.

EXAMPLE 1

*Uncatalyzed preparation of $ClO_3F$*

Ten grams of $KClO_4$ are mixed at 0° C. into 100 g. of $HSO_3F$ in a 500 ml. Pyrex round bottomed, three-necked flask fitted with a thermometer well, a stirrer and a water-cooled reflux condenser. The outlet of the condenser is connected to a series of three washing bottles, the first two containing 5% NaOH solution and the third containing NaOH pellets. Under this arrangement, effluent gases containing $ClO_3F$ product from the reactor flask pass through the condenser, bubble through the 5% NaOH solution and pass through the bed of NaOH pellets. The gases then pass into a liquid nitrogen cooled, calibrated, volumetric liquid trap fitted at its outlet with a liquid mercury pressure relief trap. The stirrer is turned on. The flask is then heated, by means of an electric mantel, to provide a temperature rate of increase of about 1° to 3° C. per minute until a maximum temperature of about 150° C. is reached. Evolution of $ClO_3F$ becomes noticeable around 40° C. when the $ClO_3F$ begins to boil out of the $ClO_3F$ saturated reaction mass. The $ClO_3F$ collects in the cooled liquid trap. When gas evolution from the reactor flask becomes negligible, the liquid trap containing the $ClO_3F$ is allowed to heat slowly to about −78° C. in a Dry Ice cooled bath. The volume of $ClO_3F$ is then measured and found to be 2.8 ml. This value corresponds to a yield of about 70% based on the weight of $KClO_4$ charged.

EXAMPLE 2

*$ClO_3F$ preparation catalyzed by $SbF_3$*

Using the apparatus and general procedure of Example 1, 10 g. of $KClO_4$, 100 g. of $HSO_3F$ and 5 g. of $SbF_3$ were reacted to form $ClO_3F$. 3.7 ml. of $ClO_3F$ were recovered, representing a yield of about 90.0% based on the $KClO_4$.

EXAMPLE 3

*$ClO_3F$ preparation catalyzed by $BF_3$*

Using the apparatus and general procedure of Example 1, 10 g. of $KClO_4$ and 100 g. of $HSO_3F$ were charged to the reaction vessel. A stream of about 10 g. of $BF_3$ was introduced directly into the liquid reaction mass by means of an inlet line disperser adjacent to the thermometer well fitting. The stream of $BF_3$ was maintained at a rate sufficient to agitate the liquid mass mildly if the stirrer were turned off. The reaction was then further carried out as in Example 1 to form $ClO_3F$. 4.0 ml. of $ClO_3F$ were recovered, representing a yield of about 97.3% based on the $KClO_4$.

EXAMPLE 4

*$ClO_3F$ preparation catalyzed by HF*

Using the apparatus and general procedure of Example 1 with the modified procedure as in Example 3, 10 g. of $KClO_4$ and 100 g. of $HSO_3F$ were reacted in the presence of a gaseous stream of 10 g. of anhydrous HF to form $ClO_3F$. 3.5 ml. of $ClO_3F$ were recovered, representing a yield of about 85.0% based on the $KClO_4$.

A series of preparations of $ClO_3F$ was carried out in a manner similar to that in Example 2 in which the amounts of $SbF_3$ charged varied. The results obtained were as follows:

| Example No. | Reactants, Parts by Weight | | | Yield, Percent $ClO_3F$ |
|---|---|---|---|---|
| | $KClO_4$ | $HSO_3F$ | $SbF_3$ | |
| 5 | 10 | 100 | 1 | 70.3 |
| 6 | 10 | 100 | 2 | 77.8 |
| 7 | 10 | 100 | 3 | 80.2 |
| 8 | 10 | 100 | 25 | 94.7 |
| 9 | 10 | 100 | 100 | 77.8 |

EXAMPLE 10

A mixture of 1 part of $KClO_4$ with about 5 parts of $SbF_3$ was gradually heated from room temperature to a temperature of 380° C. No $ClO_3F$ was formed. Some chlorine evolution was observed at about 260–310° C.

EXAMPLE 11

A mixture of 1 part of $KClO_4$ with an excess of $BF_3$ was gradually heated in an autoclave from room temperature to a temperature of about 300° C. No $ClO_3F$ was formed.

Many widely different embodiments of this invention may be made and many process variables obvious to those skilled in the art may be introduced without departing from the scope and spirit thereof and it is to be understood that my invention includes all such embodiments and is not to be limited by the above description.

I claim:

1. A process for the preparation of perchloryl fluoride comprising reacting an inorganic perchlorate with a sufficient amount of fluosulfonic acid to form perchloryl fluoride characterized by the improvement which consists of carrying out said preparation in the presence of a catalytic amount of a fluoride selected from the group consisting of boron trifluoride, antimony trifluoride, and anhydrous hydrogen fluoride.

2. A process according to claim 1 in which the fluoride is boron trifluoride.

3. A process according to claim 1 in which the fluoride is antimony trifluoride.

4. A process according to claim 1 in which the fluoride is anhydrous hydrogen fluoride.

5. A process according to claim 1 carried out at a temperature in the range from about 40° C. to about 145° C.

6. The process according to claim 1 in which the fluoride and the fluosulfonic acid are present at the ratio of from about 1:1 to about 1:100 parts by weight.

7. The process according to claim 1 in which the fluoride and the fluosulfonic acid are present at the ratio of about 1:4 to about 1:50 parts by weight.

8. A process according to claim 1 in which the perchlorate is potassium perchlorate.

9. A process for the preparation of perchloryl fluoride which comprises mixing from about 10 to about 15 parts by weight of alkali perchlorate with about 100 parts by weight of fluosulfonic acid in the presence of from about 2 parts to about 100 parts by weight of a catalytic fluoride selected from the group consisting of boron trifluoride, antimony trifluoride, and anhydrous hydrogen fluoride, agitating the mixture at a temperature of at least 0° C. and recovering perchloryl fluoride from the reaction mass.

10. A process according to claim 9 in which the fluoride is boron trifluoride.

11. A process according to claim 9 in which the fluoride is antimony trifluoride.

12. A process according to claim 9 in which the fluoride is anhydrous hydrogen fluoride.

13. A process for the preparation of perchloryl fluoride which comprises mixing an inorganic perchlorate with fluosulfonic acid in the ratio of at least six moles of fluosulfonic acid per mole of said perchlorate in the presence of a catalytic fluoride selected from the group consisting of boron trifluoride, antimony trifluoride, and anhydrous hydrogen fluoride, and agitating and heating the mixture, said catalytic fluoride and said fluosulfonic acid being present in the ratio of about 1:1 to about 1:100 parts by weight.

14. A process according to claim 13 in which the fluoride is boron trifluoride.

15. A process according to claim 13 in which the fluoride is antimony trifluoride.

16. A process according to claim 13 in which the fluoride is anhydrous hydrogen fluoride.

No references cited.